(No Model.)

T. SIDDALL.
PIPE COUPLING.

No. 317,030. Patented May 5, 1885.

Witnesses.
Frank V. Bodine
Chas. B. Case

Inventor.
Thomas Siddall
per James Buchanan
Atty

UNITED STATES PATENT OFFICE.

THOMAS SIDDALL, OF TRENTON, NEW JERSEY.

PIPE-COUPLING.

SPECIFICATION forming part of Letters Patent No. 317,030, dated May 5, 1885.

Application filed March 10, 1884. Renewed January 30, 1885. (No model.)

*To all whom it may concern:*

Be it known that I, THOMAS SIDDALL, a citizen of the United States, residing at Trenton, in the county of Mercer and State of New Jersey, have invented a certain new and useful Improvement in Pipe-Couplings, of which the following is a specification.

My invention relates to that class of couplings by the use of which attachments are speedily made and unmade, and its especial object is to provide a coupling which can be thus rapidly used, and which is capable of being applied to hose, pipes, and to ale and beer casks.

My invention is shown in the accompanying drawings, in which drawings similar parts are indicated by similar letters of reference.

Figure 1:
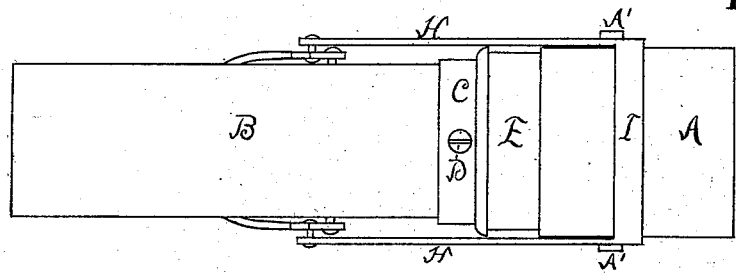
Figure 2:
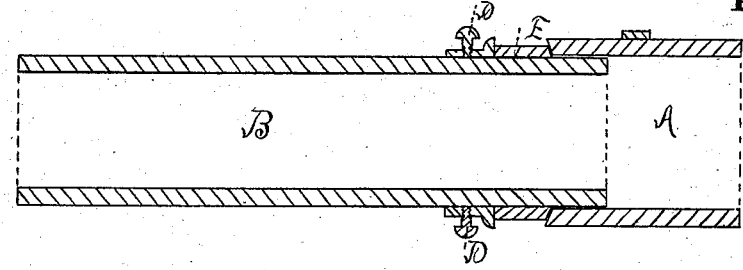
Figure 3:
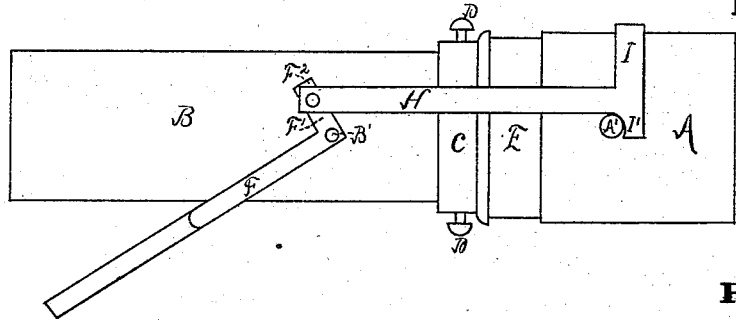
Figure 4:
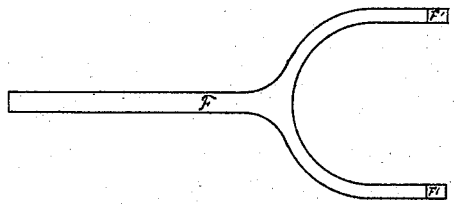

In these drawings, Figure 1 is a top view of my invention. Fig. 3 is a side view of the same. Fig. 2 is a longitudinal sectional view, and Fig. 4 is a separate view of the lever F.

In Fig. 1, A is a section of pipe or hose. B is a section of coupling. C is a collar fitted about the coupling B. This collar is adjustable by means of the screw D. Fitted about the coupling B is an elastic washer, E. On the pipe A, and indifferently attached thereto, or in one therewith, are the lugs $A^4$. On the coupling B, and pivoted thereto at B', is the lever F. This lever, as shown at Fig. 4, is divided, and a branch passes up either side of the coupling B. This lever F has a short arm, F', to which is pivoted, at $F^2$, an arm, H, connected with the yoke I. As will be seen in Fig. 1, each branch of the lever F is pivoted, and is provided with a short arm, F', and each short arm F' is pivoted to an arm, H, of the yoke I. This yoke I is provided with arms or projections I', which pass back of and bear against the lugs A'.

The operation of coupling is as follows: The lever F being raised, the arms H and yoke I are thereby retracted. The pipe A is placed upon the coupling B. The yoke I is then brought down upon the pipe A, and the arms I' of the yoke I engage the lugs A'. The lever F is then brought down, carrying forward the arms H and yoke I, and pressing, by means of the arms I' and lugs A', the pipe A firmly against the elastic washer E. The short arm F being thereby brought parallel with the arm H, the device becomes self-locking, and the whole is held firmly in position. To uncouple, the operation is exactly reversed.

What I claim as my invention, and desire to secure by Letters Patent, is—

The coupling B, provided with the elastic washer E, and the collar C, having adjusting-screws D, in combination with the pipe A, having lugs A', and with the yoke I, having arms H, and short arms I', and the lever F, pivoted to the coupling B, and having the short arms F', substantially as shown and described.

THOMAS SIDDALL.

Witnesses:
FRANK V. BODINE,
CHAS. B. CASE.